US011348394B2

(12) United States Patent
Prasad et al.

(10) Patent No.: US 11,348,394 B2
(45) Date of Patent: *May 31, 2022

(54) SYSTEM AND METHOD FOR DEPLOYING HANDHELD DEVICES TO SECURE AN AREA

(71) Applicant: MDI Security, LLC, San Antonio, TX (US)

(72) Inventors: Sanjay Prasad, San Antonio, TX (US); Troy Paddock, San Antonio, TX (US)

(73) Assignee: MDI Security, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,221

(22) Filed: Oct. 20, 2020

(65) Prior Publication Data
US 2021/0035395 A1    Feb. 4, 2021

Related U.S. Application Data

(60) Continuation of application No. 16/161,990, filed on Oct. 16, 2018, now Pat. No. 10,810,815, which is a
(Continued)

(51) Int. Cl.
*G07C 9/20* (2020.01)
*G06F 16/951* (2019.01)
(Continued)

(52) U.S. Cl.
CPC ............ *G07C 9/20* (2020.01); *G06F 16/951* (2019.01); *G06F 16/954* (2019.01); *G06F 21/78* (2013.01);
(Continued)

(58) Field of Classification Search
CPC ..... H04W 48/16; H04W 12/08; H04W 12/06; H04L 29/06; H04L 63/08; G07C 9/00;
(Continued)

(56) References Cited

U.S. PATENT DOCUMENTS 4,586,441 A    5/1986    Zekich
4,947,765 A    8/1990    Biedess
(Continued)

FOREIGN PATENT DOCUMENTS

CA    2613899    6/2008
EP    0629764    12/1994
(Continued)

OTHER PUBLICATIONS

Macias, et al., "Architecture and Protocol of a Semantic System Designed for Video Tagging with Sensor Data in Mobile Devices," Sensors, vol. 12 (Feb. 14, 2012) pp. 2062-2087.
(Continued)

*Primary Examiner* — Nam V Nguyen
(74) *Attorney, Agent, or Firm* — Schultz & Associates, P.C.

(57) ABSTRACT

A handheld security system includes a set of handheld devices positioned at a group of access points to a secure area. The handheld device includes a set of input/output devices including a text and graphics display, a camera, a local security database and a set of security devices including an RFID reader, a bar code reader, a magnetic stripe card reader and a biometric scanner. The set of handheld devices are communicatively connected through wireless signaling and protocol to one another and to a server operating a global a global security database. The local security database is synchronized to the global security database. A location stack table is continuously updated with security events and monitored for violation of a set of anti-passback rules. An association table associates a set of assets and a set of personnel, allowing for visitor tracking and asset tracking on a schedule.

20 Claims, 13 Drawing Sheets

Related U.S. Application Data division of application No. 15/483,848, filed on Apr. 10, 2017, now Pat. No. 10,102,703, which is a division of application No. 15/167,538, filed on May 27, 2016, now Pat. No. 9,619,951, which is a division of application No. 14/467,624, filed on Aug. 25, 2014, now Pat. No. 9,355,508, which is a division of application No. 13/609,097, filed on Sep. 10, 2012, now Pat. No. 8,819,855.

(51) Int. Cl.
| | |
|---|---|
| *G06F 16/954* | (2019.01) |
| *G07C 9/27* | (2020.01) |
| *G06F 21/78* | (2013.01) |
| *H04W 12/06* | (2021.01) |
| *G06K 7/10* | (2006.01) |
| *G06K 7/14* | (2006.01) |
| *G07C 9/00* | (2020.01) |
| *G06F 21/62* | (2013.01) |
| *H04N 1/00* | (2006.01) |
| *H04L 9/40* | (2022.01) |

(52) U.S. Cl.
CPC ....... *G06K 7/10366* (2013.01); *G06K 7/1413* (2013.01); *G07C 9/00571* (2013.01); *G07C 9/27* (2020.01); *H04L 63/08* (2013.01); *H04W 12/06* (2013.01); *G06F 21/6218* (2013.01); *G08C 2201/20* (2013.01); *H04N 1/00244* (2013.01)

(58) Field of Classification Search
CPC ..... G07C 9/27; G07C 9/00571; G06F 16/951; G06F 16/954; G06F 21/78; G06F 21/6218; G06K 7/10366; G06K 7/1413; G08C 2201/20; H04N 1/00244
USPC .................................................. 340/5.6, 5.7
See application file for complete search history.

(56) References Cited

U.S. PATENT DOCUMENTS

| | | | |
|---|---|---|---|
| 5,615,622 A | 4/1997 | Moses et al. | |
| 5,692,446 A | 12/1997 | Becker et al. | |
| 5,886,634 A | 3/1999 | Muhme | |
| 5,992,094 A | 11/1999 | Diaz | |
| 6,484,650 B1 | 11/2002 | Stomski | |
| 6,747,564 B1 | 6/2004 | Mimura et al. | |
| 6,867,683 B2 | 3/2005 | Calvesio et al. | |
| 6,950,536 B2 | 9/2005 | Houvener | |
| 7,222,241 B2 | 5/2007 | Milgramm et al. | |
| 7,280,030 B1 | 10/2007 | Monaco | |
| 7,385,497 B2 | 6/2008 | Golden | |
| 7,397,892 B2 | 7/2008 | Linev | |
| 7,631,805 B2 | 12/2009 | Larson et al. | |
| 7,634,802 B2 | 12/2009 | Chiloyan | |
| 7,707,951 B1 | 5/2010 | Prasad | |
| 7,809,951 B2 | 10/2010 | Hellenthal | |
| 7,822,989 B2 | 10/2010 | Libin et al. | |
| 7,900,398 B2 | 3/2011 | Liles, Jr. | |
| 8,015,754 B2 | 9/2011 | Slagel | |
| 8,468,211 B2 | 6/2013 | Miller | |
| 8,819,855 B2 * | 8/2014 | Prasad ................... | G07C 9/20 726/30 |
| 9,082,235 B2 | 7/2015 | Lau et al. | |
| 9,237,139 B2 | 1/2016 | Shaikh | |
| 9,355,508 B2 * | 5/2016 | Prasad ................. | H04W 12/06 |
| 9,619,951 B2 * | 4/2017 | Prasad ................. | G06F 16/954 |
| 9,792,422 B1 | 10/2017 | Trundle et al. | |
| 10,102,703 B2 * | 10/2018 | Prasad ................... | G06F 21/78 |
| 10,810,815 B2 * | 10/2020 | Prasad ................. | H04W 12/06 |
| 2002/0110204 A1 | 8/2002 | Farine et al. | |
| 2002/0188854 A1 | 12/2002 | Heaven et al. | |
| 2003/0051173 A1 | 3/2003 | Krueger | |
| 2004/0078335 A1 | 4/2004 | Calvesio et al. | |
| 2006/0018519 A1 | 1/2006 | Siegel et al. | |
| 2007/0008138 A1 | 1/2007 | Mosher, Jr. et al. | |
| 2007/0206839 A1 | 9/2007 | Hanna et al. | |
| 2010/0223466 A1 | 9/2010 | Roskowski | |
| 2010/0308959 A1 | 12/2010 | Schorn | |
| 2011/0001827 A1 | 1/2011 | Ortiz et al. | |
| 2011/0067028 A1 | 3/2011 | Cozart et al. | |
| 2011/0205016 A1 | 8/2011 | Al-Azem et al. | |
| 2011/0247058 A1 | 10/2011 | Kisters | |
| 2011/0314515 A1 | 12/2011 | Hernoud et al. | |
| 2011/0320037 A1 | 12/2011 | Frugone | |
| 2012/0022958 A1 | 1/2012 | de Sylva | |
| 2012/0329429 A1 | 12/2012 | Jabara et al. | |

FOREIGN PATENT DOCUMENTS

| | | |
|---|---|---|
| EP | 1811421 | 7/2007 |
| JP | 4367099 | 12/1992 |
| WO | 199723846 | 7/1997 |
| WO | 200201509 | 1/2002 |
| WO | 2006124029 | 11/2006 |

OTHER PUBLICATIONS

Nichols, et al., "Mediator and Medium: Doors as Interruption Gateways and Aesthetic Display," ACM (2002) 9 pages.
Ravi, et al., "Accessing Ubiquitous Services Using Smart Phones," IEEE (2005) 11 pages.
Sanchez, et al., "Video Sensor Architecture For Surveillance Applications," Sensors, vol. 12 (Feb. 3, 2012) pp. 1509-1528.
Schaefer, S., "Secure Trade Lane: A Sensor Network Solution for More Predictable and More Secure Container Shipments," ACM (2006) pp. 839-845.

* cited by examiner

| assoc_id | person1_id | person2_id | asset1_id | asset2_id | description | instructions | ... |
|---|---|---|---|---|---|---|---|
| 871 | 872 | 873 | 874 | 875 | 876 | 877 | |

| ... | exp_location | exp_time | obsv_loc | obsv_time | checked_out | checked_in |
|---|---|---|---|---|---|---|
| | 878 | 879 | 880 | 881 | 882 | 883 |

| event id | event time | area to | area from | photo | person id | asset id |
|---|---|---|---|---|---|---|
| 4 | 12:01p | 1 | 0 | pic_id3 | ...4327 | |
| 3 | 11:12a | 3 | 2 | pic_id2 | ...4327 | |
| 2 | 11:05a | 2 | 1 | pic_id1 | ...4327 | |
| 1 | 11:00a | 1 | 0 | | ...4327 | |
| 0 | --- | 0 | --- | | ...4327 | |

891  892  893  894  895  896  897

SYSTEM AND METHOD FOR DEPLOYING HANDHELD DEVICES TO SECURE AN AREA

CROSS-REFERENCE TO RELATED APPLICATIONS

This application is a continuation of application Ser. No. 16/161,990, filed on Oct. 16, 2018, now U.S. Pat. No. 10,810,815, which is a divisional of application Ser. No. 15/483,848, filed on Apr. 10, 2017, now U.S. Pat. No. 10,102,703, which is a divisional of application Ser. No. 15/167,538, filed May 27, 2016, now U.S. Pat. No. 9,619,951, which is a divisional of application Ser. No. 14/467,624, filed Aug. 25, 2014, now U.S. Pat. No. 9,355,508, which is a divisional of U.S. patent application Ser. No. 13/609,097, filed Sep. 10, 2012, now U.S. Pat. No. 8,819,855. Each patent application identified above is incorporated here by reference in its entirety to provide continuity of disclosure.

FIELD OF THE INVENTION

The present invention relates to computer driven security systems including hardware and software configurations to operate access control and video surveillance systems.

BACKGROUND OF THE INVENTION

Historically, access control systems have required dedicated card readers and fixed door controllers connected to electro-mechanical door locks or gates. Local door controllers provide for recognition of magnetic cards and generation of control signals for electromagnetic door locks or turnstiles. Separate and apart from access control, video surveillance and video recording systems have required fixed cameras and positioning motors and matrix switches coupled with mass storage devices such as digital video recorders to store video data. However, in many situations the access control systems and video surveillance system have been separate. Such legacy systems include, among other things, digital and analog cameras, and positioning hardware, door controllers, gate controllers, alarms, motion sensors, card readers, biometric readers and keypads for password entry. For each of these different types of legacy systems, there are numerous controllers and protocols.

Modern access control systems seek to integrate access control and video surveillance with an integrated combination of hardware and software operated on a central computer server. Generally, such servers provide control for multiple access control points, communication with local controllers, cameras and camera position controllers and digital and analog video recording devices. The servers also generally provide software for user interfaces, database control and drivers for various hardware components.

FIG. 1 is a block diagram of a prior art security system. Legacy security systems are typically deployed in a building facility 110 surrounded by campus grounds 111 and secured by fence 112 having vehicle and pedestrian entrances 113, 114. Robotically controlled "pan, tilt, zoom" ("PTZ") cameras 123, 124 are positioned to view the entrances and scan along a predetermined path known as a "tour". Security server 119 is a network server including graphic user interface 120, database 121 and mass video storage 122 resident on network 125. Security server 119 operates a security software program that coordinates the functions of the local controllers, physical access hardware database 121 and mass video storage 122. Network 125 is further connected to local controllers 101, 102, 103 and 104. The local controllers each are hardwired to physical access hardware 105, 106, 107 and 108. The physical access hardware includes devices such as turnstiles, magnetic door locks, mantraps, gate controllers and hydraulic vehicle barricades. Network 125 is generally local area network, such as an Ethernet network and includes legacy analog connectors such as RGU 58 for communication of analog video.

In use, an access badge is swiped through a card reader and a code is typed into a keypad. Digital signals, including codes from the access badge and the keypad, are locally stored and transmitted via the network to the server. The security software validates the access badge and code and transmits a signal to the local controller to allow or deny access. The local controller then sends an analog signal to the hardware component.

Legacy security systems are highly susceptible to failure. For example, failure of any wired connection between doors, local controllers and the server will cause the access controller or door controller to be inoperable. As another example, component "mismatch" due to hardware changes and software updates can cause system failure. Still further, equipment failure of a hardwired access point often leaves the access point unusable until repair is made.

U.S. Patent Application No. 2011/0247058 to Kisters discloses an on-demand personal identification method incorporating a PDA with a sensor system interface and a wireless transmitter/receiver to transmit data. However, no provision is made for integration of the PDA into a legacy security system or to provide for communication of coordinated messages between PDAs, nor is "self-discovery" of a PDA network disclosed.

U.S. Pat. No. 7,809,951 to Hellenthal discloses a system and method for automated border crossing checks that includes reading identification data from an identification card using a card reader attached to a gate and conveying the identification data to a database. However, no provision is made for replacing a malfunctioning card reader while repairs are made.

U.S. Pat. No. 4,586,441 to Zekich discloses a security system for access to a secure area with two sets of revolving doors defining chambers with identification sensors. A secure guard room includes a pass window for accepting and/or supplying passcards for entry. However, no provision is made for substituting one controller for another if the system becomes inoperable.

U.S. Pat. No. 6,867,683 to Calvesio, et al. discloses controlling access to high security zones through doors with biometric and ID readers to identify individuals and a scheduler to ensure that an individual is only allowed access to one zone at a time. However, no provision is made to execute these functions portably.

U.S. Publication No. 2006/0018519 to Siegel, et al. discloses a handheld device used to record certain biometric data and then transmit it to an offsite processing center for comparison. However, no provision is made to coordinate functions of a group of handheld devices or to accommodate legacy hardware.

U.S. Pat. No. 8,015,754 to Slagel discloses a portable security facility having a security sensing device for reading an access device which unlocks a barrier. However, no provision is made for control of legacy systems or for discovery of other portable facilities. Further, no provision is made for database coordination.

SUMMARY OF THE INVENTION

A distributed handheld security system is provided which includes a networked set of handheld devices that can coordinate functions through a central server and accommodates legacy hardware in one embodiment. The handheld devices each include text and graphics displays, cameras, local databases such as RFID readers, a bar code readers, card readers, biometric scanners and programmable routers. The handheld devices communicate with each other and the server through a wireless network. Legacy hardware is accommodated by distribution of known software drivers, protocols and addresses to replace or redirect malfunctioning components. Local databases are provided and are synchronized with a global security database resident on the server. The handheld devices include location stack tables continuously updated with security events and monitored for violation of a set of anti-passback rules.

In use, the handheld devices are configured to flexibly substitute for or replace access control points in a security system. Further, messaging systems are provided to allow the handheld devices to communicate and display information relevant to access control both to each other and to the server.

BRIEF DESCRIPTION OF THE DRAWINGS

FIG. 8C is a block diagram of a memory model of an association table of a preferred embodiment of a handheld device.

FIG. 8D is a block diagram of a memory model of a location stack table of a preferred embodiment of a handheld device.

DETAILED DESCRIPTION OF THE INVENTION

Figure 1:
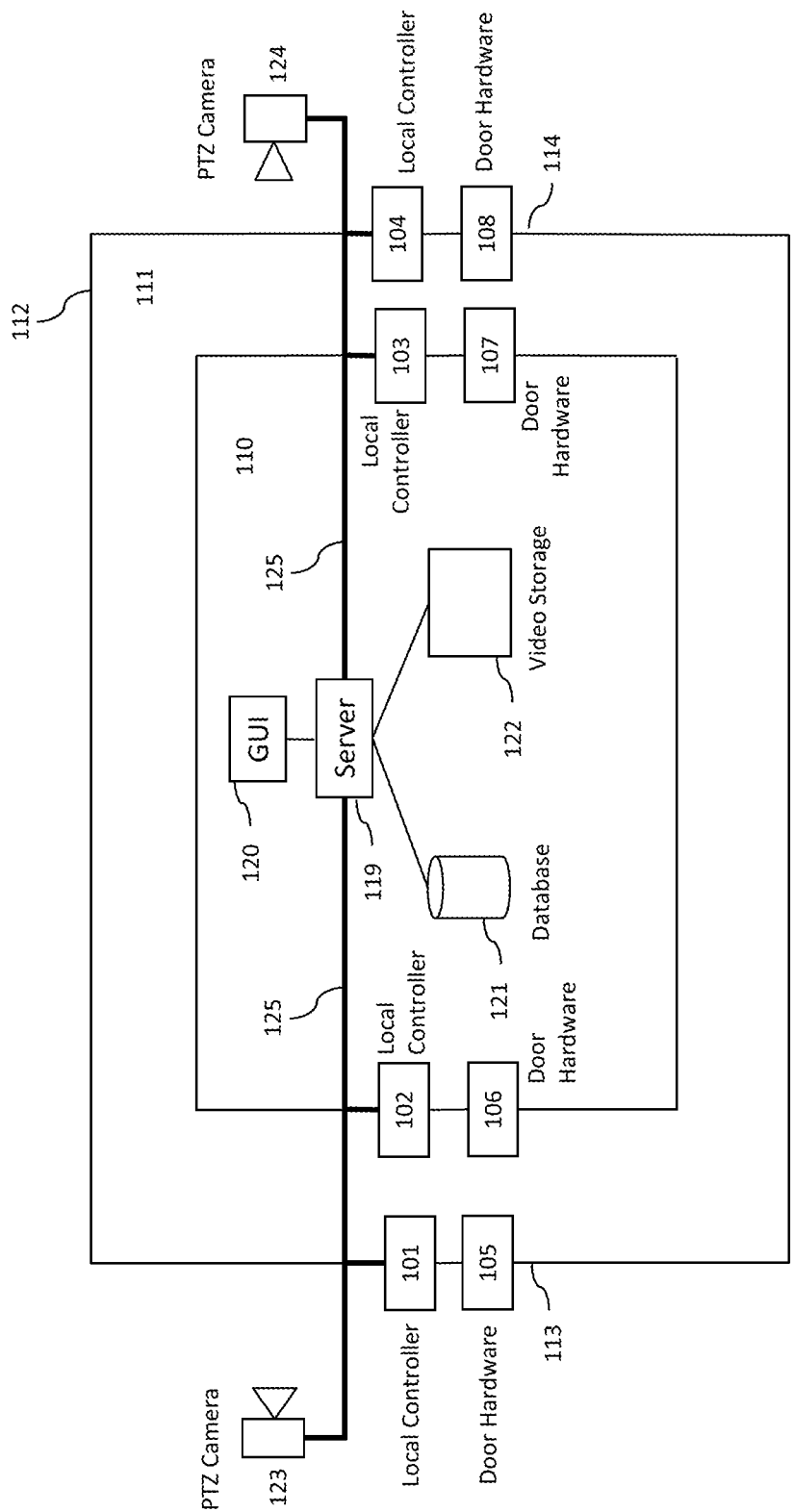
FIG. 1 is a block diagram of a prior art security system.

The following disclosure provides many different embodiments, or examples, for implementing different features of the system described. Specific examples of components and arrangements are described below to simplify description. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
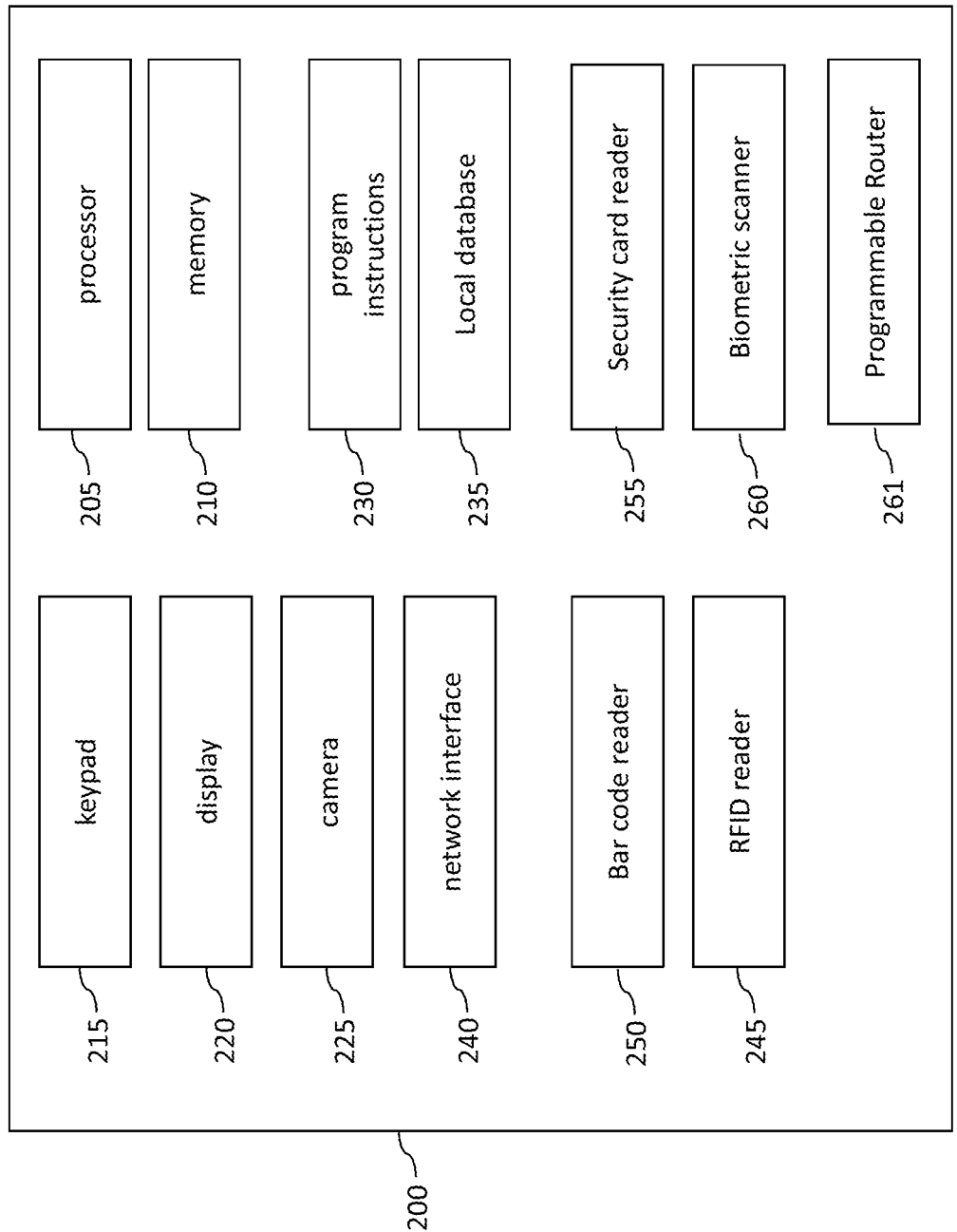
FIG. 2 is a schematic diagram of a preferred embodiment of a handheld device.

Referring to FIG. 2, handheld device 200 includes processor 205, memory 210 and a set of peripheral devices. The peripheral devices include keypad 215, display 220, camera 225, network interface 240, RFID reader 245, bar code reader 250 capable of reading bar codes, QR codes and the like, security card reader 255 and a biometric scanner 260. The peripheral devices also include programmable router 261. In preferred embodiments, the handheld device can include a smart phone, a personal digital assistant, a dedicated hardware device or other digital device that are portable and capable of supporting a network connection, such as laptop computers and tablet computers.

Network interface 240 enables wired and wireless communications. In a preferred embodiment, network interface 240 includes a local radio communications chipset that allows direct communication between several handheld devices of voice information and data.

Handheld device 200 further includes security program instructions 230 residing in memory 210 and executed by processor 205 to interact with a local database 235 and the set of peripheral devices.

In a preferred embodiment, handheld device 200 provides authentication using security card, pin number and biometric identification for FIPS 201 compliance. Security card reader includes many card reader types for many different security card types. For example, security card reader can be a magnetic card reader. In a preferred embodiment, security card types supported by the security card reader include, but are not limited to, FIPS 201-compliant PIV and PIV-I cards, first responder authentication credential (FRAC), common access cards (CAC), mariner administrative cards, US State Department PKI cards, transportation worker identity (TWIC) cards, contact and contactless smart cards, U.S. driver's licenses. The biometric scanner can be any number of biometric devices, including but not limited to a fingerprint scanner, an eye scanner, a voice print recorder and a facial profiler.

Figure 3:
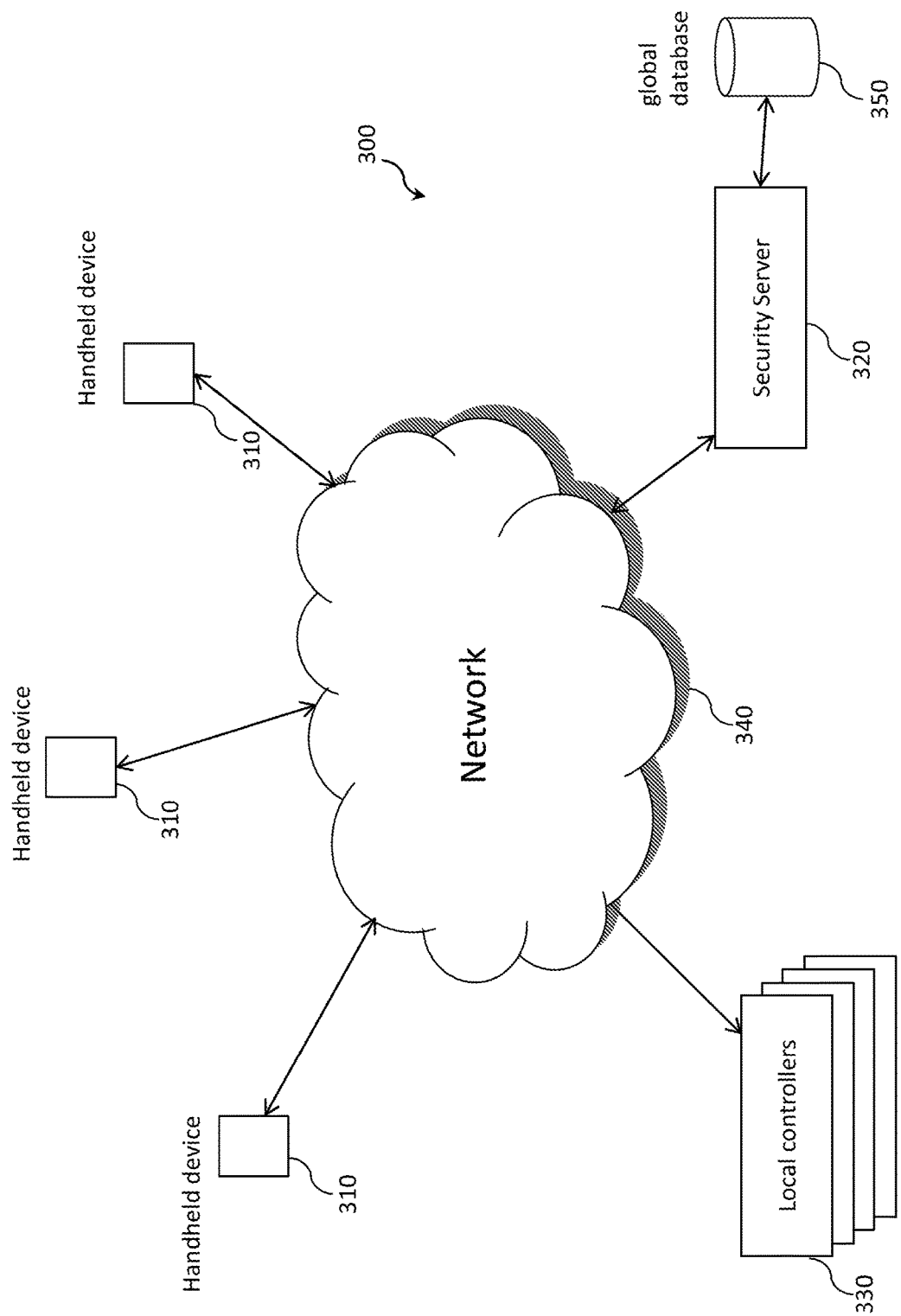
FIG. 3 is a schematic diagram of a preferred architecture for the system.

Referring to FIG. 3, in a preferred embodiment of a system architecture is shown. Architecture 300 includes a set of handheld devices 310 connected through a network 340 to security server 320 and local controllers 330. The number of handheld devices is configurable and limited only by the maximum allowed by the supporting network. Handheld devices 310, communicate through network interfaces using wireless signaling and protocol to network 340. Examples of the wireless signaling may be a wireless LAN connected to the network 340 through suitable routers and local networking equipment, a local WiMax network connected to network 340 through a communications provider radio area network or a cellular system connected to network 340 through a nearby cellular communications radio area network on a communications provider's cellular network. Other protocols and systems are conceivable and the invention is not limited to any particular type of wireless protocol. In a preferred embodiment, network 340 is an IP enabled network such as the internet.

Handheld devices 310 further communicate through network 340 to security server 320. Security server 320 includes a general purpose computer including a processor and memory. Security server 320 is connected to global database 350. In the preferred embodiment the relational database is an Oracle database controlled by software resident on security server 320. Other relational databases will suffice so long as query and access times are reasonably small.

Handheld devices 310 communicate through network 340 to a set of local controllers 330 physically installed at the secured area to electronically control doors, routers, cameras and other hardware.

Figure 4:
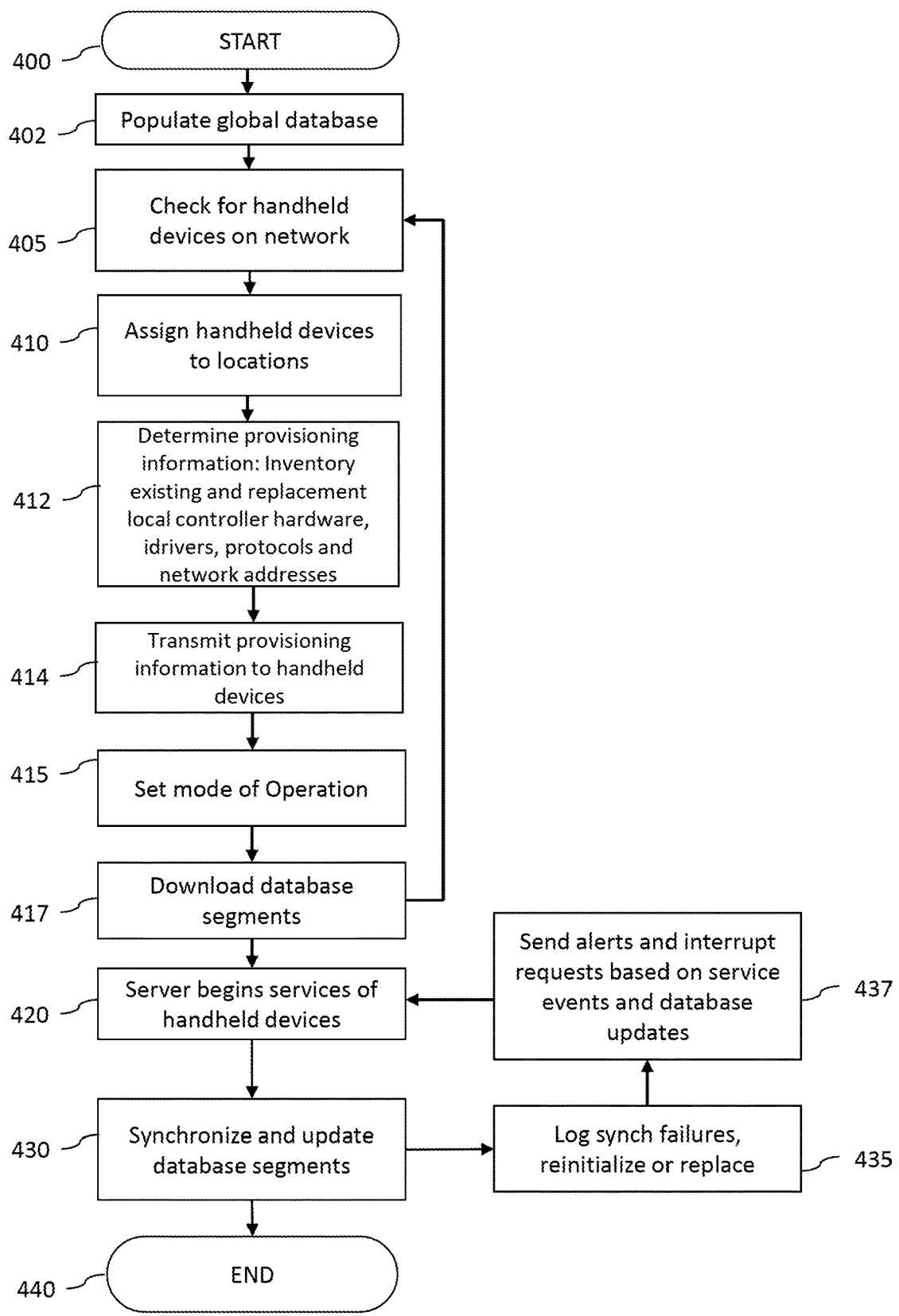
FIG. 4 is a flow chart of a program to initialize and operate a preferred embodiment of a server.

Referring to FIG. 4, a program for system initiation at the server is described. At step 400, program instructions are started. At step 402, the global database is initialized and populated with relevant information and association between data fields. At step 405, the server poles all handheld devices available and authenticates them. During authentication, a unique serial number of each handheld device is requested from the handheld device, received, logged and verified. Verification data is provided by global database 350 so that only authorized handheld devices are enabled. In a preferred embodiment, communications between handheld devices and between a handheld device and the server are encrypted. A table is created containing a list of authorized handheld devices and their ID numbers.

At step 410, a geographic map is analyzed and access points are identified. The server then assigns each handheld device to a physical location and receives acknowledgement from each handheld device that it is positioned at the location. In a preferred embodiment, the acknowledgement is verified by geophysical location services, such as the Global Positioning System (GPS).

At step 412, provisioning information for existing local controllers and replacement local controllers is determined by inventorying local controller hardware, drivers (e.g. API interfaces), protocols, physical locations and network addresses. Replacement local controllers are local controller units that have become inoperable and for which a handheld device will provide a substitute controller function.

At step 414, the provision information is transmitted to the set of handheld devices based on the physical location proximity to the existing and replacement local controllers.

At step 415, a mode of operation is determined and sent to the handheld device. The mode of operation specifies the number of handheld devices enabled and their locations, synchronization requirements, wireless protocols, encryption protocols and initial deployment instructions.

In one preferred embodiment the mode of operation can be set to "server," "sibling" or "autonomous." In "autonomous" mode, the handheld devices operate as standalone portals. All authorization events are conducted with use of the local database and local peripheral or hardware interface devices. The local database is not synchronized. In "sibling" mode, each handheld device communicates with its sibling handheld devices only. Each handheld device synchronizes its local database with all other sibling local databases. The local databases are not synchronized with the server. In "server mode" the handheld devices communicate with the server and synchronize the local databases with the global database. At step 417, a database segment comprising a set of database records specific to the handheld device is downloaded to each handheld device.

At step 420, the server initiates services of the operations of all handheld devices which are authenticated. Servicing the local operations of the handheld devices includes responding to log events, authorization events, security question events, database synchronization, and logging shutdown of handheld devices. At step 430, the server synchronizes and updates database segments with data from the local database of each handheld device. At step 435, synchronization failures are logged and are considered a "handheld device failure." When such a failure occurs, a new handheld device is initiated automatically and dispatched to the geographic location of the failure. An alert signal is generated and displayed. At step 437, which is optional, the server sends messages, interrupt requests, software updates, instructions and alerts to each of the handheld devices. Steps 420, 430, 435 and 437 are repeated until the system powers down at step 440.

Figure 5A:
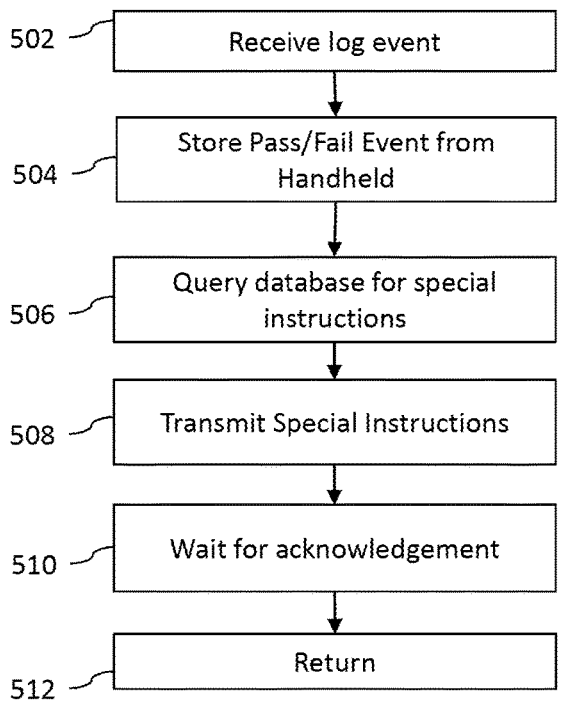
FIGS. 5A-5C are flow charts of preferred embodiments of examples of event responses of the server.

Referring to FIG. 5A, the receive log event service carried out on the server is described. At step 502, the server receives a log event from one or more handheld devices. Receive log events are serviced in a sequential queue.

At step 504, the server stores the "pass/fail" event received from the handheld in the database, for example, a date and time of the event, badge numbers and, optionally, video data. At step 506, the server queries the global database for special instructions which have been associated for the "pass/fail" event. At step 508, the special instructions are transmitted to one or more of the handheld devices registered on the system. Special instructions executed by the server can take several forms. Special instructions may include instructions to send an email or text message to a recipient regarding the log event. Other examples of special instructions include sending text messages to selected handheld units at various locations for coordinated activity, such as a lockdown or closure of access points. Special instructions can also include instructions to one or more video cameras located on the handheld units or a hardwired system to activate or focus on a particular location or tour. Another example of special instructions is to change a physical location of a handheld unit. Another example of special instructions is transmission of written instructions or pictures be displayed on the handheld devices for activities such as arresting or detaining a suspect or impounding a vehicle or property. Further, special instructions can provide queries to local databases or requests to handheld devices to provide further authorization information or video data. These special instructions are exemplary. Other special instructions will be obvious to those of skill in the art. At step 510, the server waits for an acknowledgement from one or more of the handheld devices acknowledging the receipt of the special instructions. At step 512, the server returns to servicing local operations.

Figure 5C:
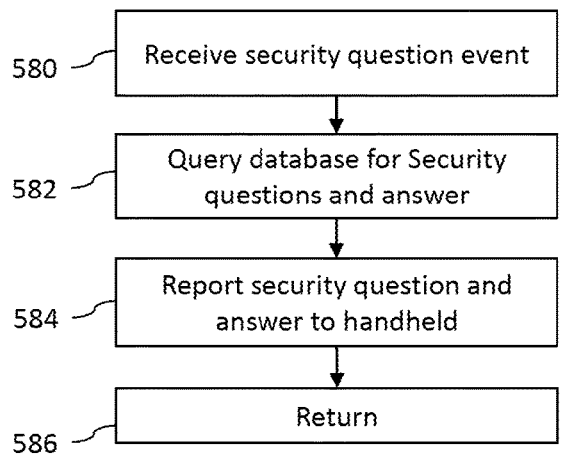
Figure 5B:
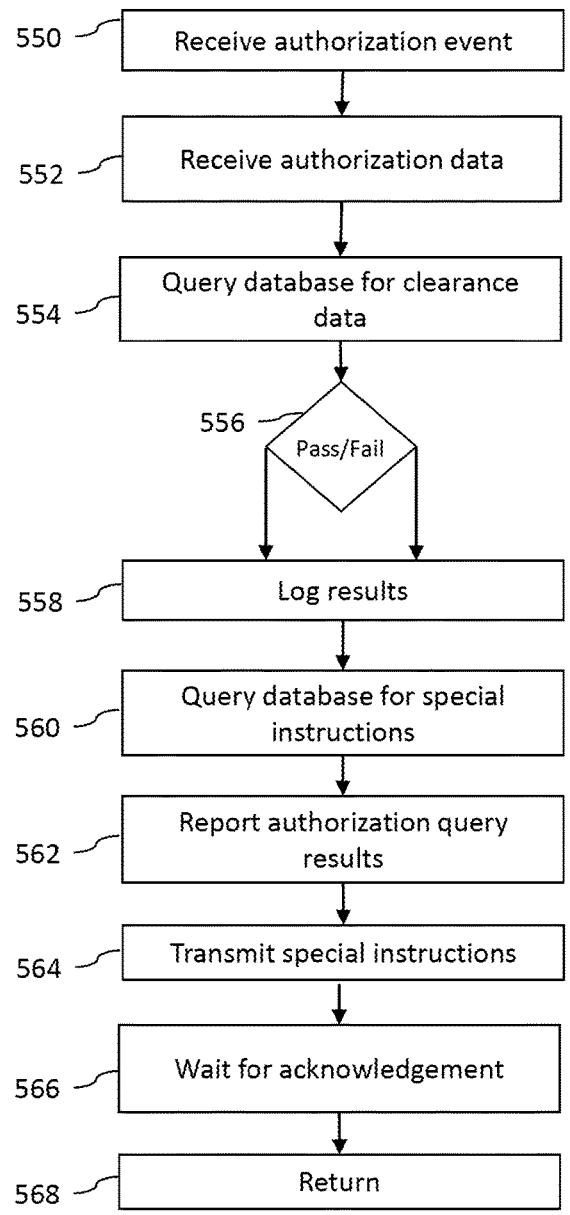

Referring to FIG. 5B, a method for receiving and servicing an authorization event is described. At step 550, the server receives an authorization event from one or more handheld devices. If multiple authorization events are received they are serviced in order. At step 552, a server receives authorization data from one or more handheld devices. The authorization data may include badge id, passwords, or biometric data or video data or other data associated with the authorization event. At step 554, the server queries the global database for clearance data. At step 556, the authorization data is compared against the clearance data for a clearance condition (e.g. pass or fail). At step 558, the clearance condition is logged to the database. At step 560, the server queries the global database for special instructions associated with, either, the clearance condition and/or the authorization. At step 562, the server reports the clearance condition to the handheld. At step 564, the special instructions are transmitted to the handheld device or devices. At step 566, the server waits for an acknowledgement of the authorization report and the special instructions from the handheld device. At step 568, the server returns to servicing local operations. Any failure to receive an acknowledgement is treated as a handheld device failure.

Referring to FIG. 5C, a security question event is described. At step 580, the server receives a security question event from one or more handheld devices. The events are serviced in the order in which they are received. At step 582, the server queries the database for a security question and answer associated with a particular badge or other authorization data. At step 584, the security question and answer are reported to the handheld device. At step 586, the server returns to servicing local operations.

The server described can be a digital computer server having a set of server processors and include a set of server program instructions stored in a server memory and on a server digital media. The digital computer server includes a database system with a global database, residing in server memory and the server digital storage media and also executed by the set of server processors. Furthermore, it is understood that the database system is inherently accessible by the executed methods via the set of server processors, server memory and server digital storage media and via a network through an application programming interface. The server may also be a set of physical machines, a set of virtual machines or a combination thereof.

Figure 6:
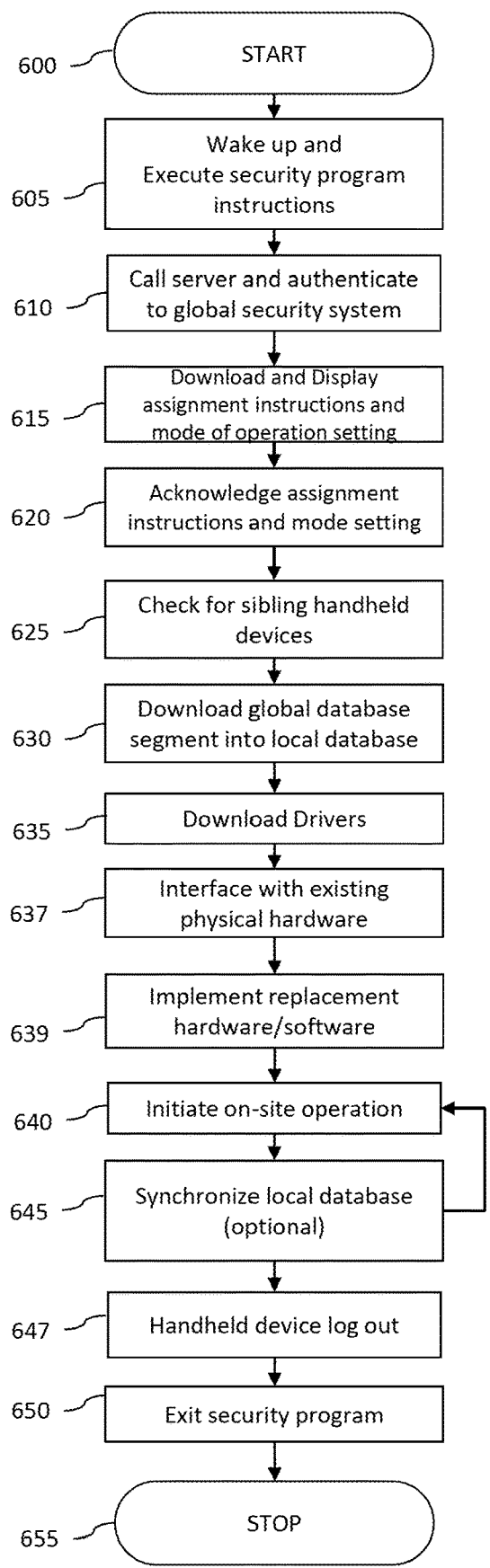
FIG. 6 is a flow chart of a method of initialization of a preferred embodiment of a handheld device.

Referring to FIG. 6, a method for initialization of a handheld device is described. At step 600, a handheld device is powered up. At step 605, the processor loads the program instructions from memory and executes them. At step 610, the handheld device communicates with the server to authenticate its device id and status. After authentication, the handheld device communicates with the server. At step 615, the handheld device downloads and implements assignment instructions and a mode setting for a mode of operation from the server and displays the assignment instructions. At step 620, the assignment instructions and the mode setting are acknowledged. At step 625, the handheld device examines the local wireless network to find sibling handheld devices. This is accomplished by first receiving a table of all active handheld devices and their identification numbers, along with a unique authentication code for each handheld device from the server. The authentication codes can be changed. A broadcast signal is then sent on a predetermined channel to verify the table of all active handheld devices. The broadcast signal includes a specific code and an identification of the sending unit. When the signal is received, each handheld device responds with its own identification number which is stored in a table on each machine, and an acknowledgement code. Each machine maintains a table of device identifications and acknowledgements. If, after a predetermined time period, the table is not completed, a message is sent to the server to report a failure of each non-responding handheld device.

At step 630, the handheld device downloads a database segment from the global database into the local database. A database segment is a set of data records in the global database that is relevant to the operation of the particular handheld device. At step 635, the handheld device downloads drivers from the global database including drivers for existing (operable) physical hardware and drivers for replacement (inoperable) hardware.

At step 637, the handheld device begins interface with existing physical hardware. Wireless or physical connections and data communication are established between the existing hardware devices, such as door controllers and/or PTZ cameras. If necessary, programmable routers are instantiated and monitored to begin data communication between hardware and/or video components and the server. The local hardware devices implement instructions from the handheld devices.

At step 639, the handheld device implements replacement hardware as required. For example, if a PTZ camera is inoperable, an onboard peripheral device, such as a camera, is instantiated and begins transmission of video data to the server. The video data available from the peripheral on the handheld device can be focused on a particular location or tour to replace the video information lost from the damaged camera. Similarly, inoperable physical barricades, such as mantraps or road blocks, are replaced with portable peripheral devices with which the handheld device can communicate. In this step, communications are established with the replacement hardware. Of course, those skilled in the art will recognize that other replacement hardware and communications protocols can be implemented besides those described.

At step 640, on-site continuous operation begins according to the mode of operation. At step 645, depending on the mode of operation selected, the local database is periodically synchronized to the global database or other local databases by updating the database segment with recent security events and downloading new information contained in the database segment. At step 647, the handheld device disconnects from the system by logging out. At step 650, the handheld device discontinues executing the security program instructions. The handheld device is ultimately powered off at step 655.

Figure 7:
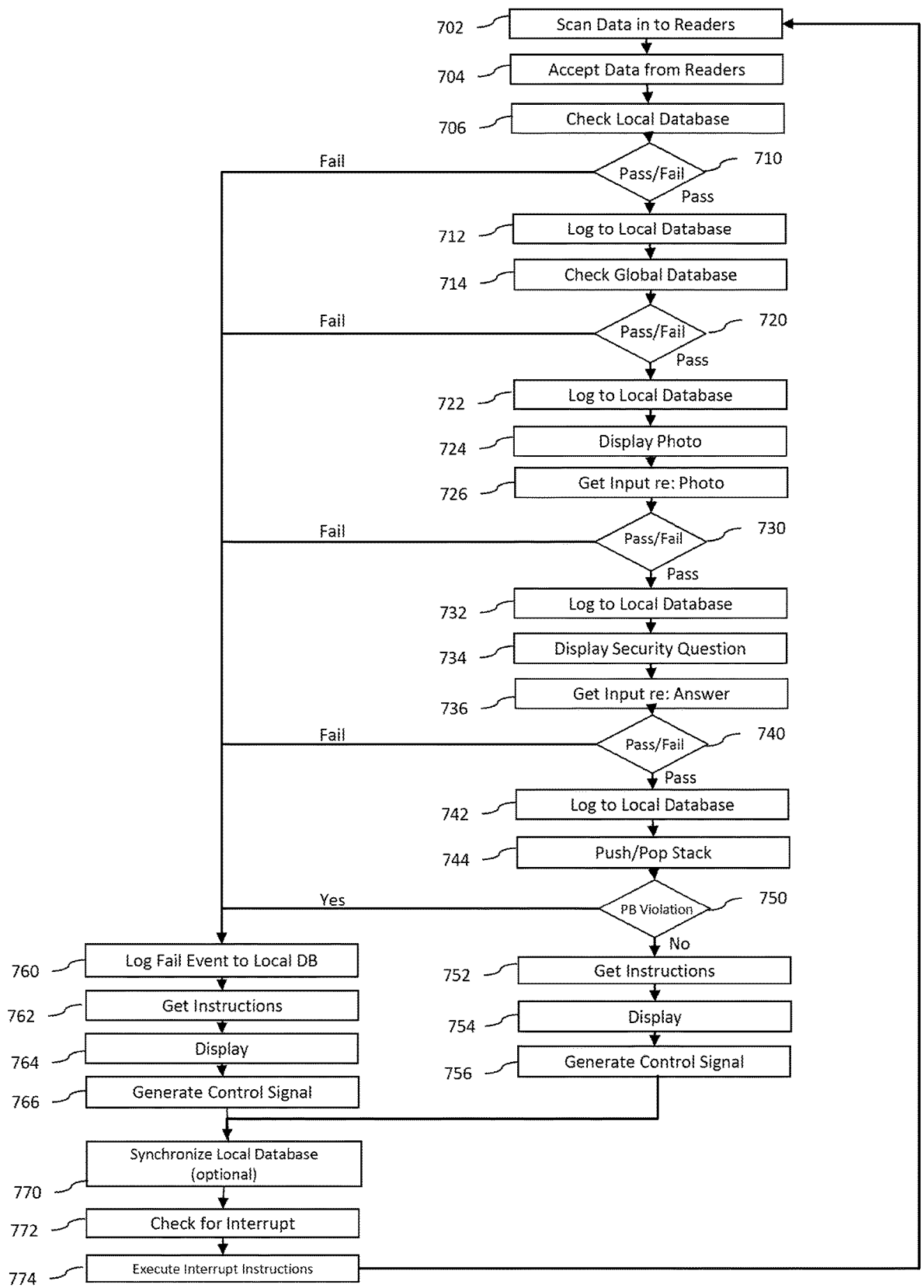
FIG. 7 is a flow chart of a method of operation of a preferred embodiment of a handheld device.

Referring to FIG. 7, a program for on-site continuous operation of a handheld device is described. At step 702, the handheld device accepts signals from one or more peripheral devices. For example, a magnetic card reader reads the data from a magnetic card or badge. As another example, a fingerprint image or retina scan can be obtained from peripheral devices. As another example, a barcode may be read from a tag located on a document or other physical item. At step 704, the handheld device accepts security data from the one or more of the security devices. At step 706, the local database is queried based on the security data. The database returns a "pass" condition if the data from the security device matches a designated field. Otherwise a "fail" condition is returned. At step 710, the pass/fail condition is assessed by the handheld device. If the pass/fail condition is 'fail', then step 760 is performed where a "fail" event is associated to the security data and logged to the local database. At step 762, the handheld device receives any special instructions from the server associated with a "fail" event. For example, instructions to the user to detain a suspect or impound a vehicle. At step 764, the handheld device displays any special instructions. At step 766, the handheld device generates any required control signals to operate hardware devices. For example, transmitting various driver signals to "seize" a mantrap or raise a roadway bollard. In another example, PTZ signals are sent to a local camera to focus on a particular location and record an image. At step 770, depending on the mode selected, synchronization of the local database to the global database or other local databases, is initiated and conducted after receiving an acknowledgement signal from the server. At step 772, the handheld device checks a queue in memory to determine if an interrupt signal has been received from a sibling handheld or the server. Interrupt signals include messages for communication to a user, machine instructions such as additional programming for the handheld relocation instructions, reassignment instructions and/or control signal (driver) updates. At step 774, the handheld stores and executes the interrupt instructions. In the case of messages, the messages are displayed. In the case of software updates, the handheld replaces the software in its memory upon a system restart. Then the method returns to step 702.

If at step 710, the pass/fail condition is 'pass' then the method performs step 712 where a "pass" event is associated to the security data and logged to the local database.

At step 714, the program executes an optional step of querying the global database at the server regarding the security data. The global database returns "pass" condition if the data from the security data matches a designated field in the global database. Otherwise a "fail" condition is returned. At step 720, the pass/fail condition is assessed by the handheld device. If the pass/fail condition is "fail," then the program proceeds to step 760 and executes the instructions found there. If the condition is "pass," then the program proceeds to step 722. At step 722, the pass event is associated to the security data and logged to local database. At step 724, which is optional, a photo of the person or object associated to the security data is displayed. At step 726, the program waits for an input response from the user acknowledging a pass/fail condition based on the displayed photograph. At step 730, the program analyzes the input response. If the response is "fail," then the program proceeds to step 760. If the response is "pass," then at step 732, a "pass" event is logged to local database. And the program proceeds to step 734. At step 734, which is optional, the handheld device displays a security question. For example, a security identification question such as "State your mother's maiden name" is displayed. In an alternate embodiment, the security question is generated by the global server on a rotating and periodic basis and uploaded to each handheld unit for display.

At step 736, the handheld device waits for input from the user regarding the responses to security question. At step 740, if the response is incorrect, a "fail" condition is generated and the programs proceeds to step 760. If, however, the input to the security question is correct, then a "pass" condition is generated in step 740 and the method proceeds to step 742. At step 742, the local database is updated with the "pass" event and time.

At step 744, the local stack is updated by pushing the user id, asset id, "to" and "from" location and time onto the stack or popping it from the stack, depending on if the user is entering or leaving a secured area. If an attempt to push a location onto a stack is made and a location is already present on the stack, then, step 750, an error condition will be generated known as "anti-passback" violation. Similarly, an "anti-passback" violation is generated if data is attempted to be popped off the stack when it does not exist on the stack. The program then moves to step 760. If there is no "anti-passback" violation, at step 750, the program moves to step 752. At step 752, instructions are received from the server or other sibling handheld units. At step 754, instructions containing a message for the user are displayed. At step 756, the handheld generates an appropriate control signal to operate local hardware such as door locks, turnstiles or programmable routers. The program then proceeds to step 770 and executes the steps found there.

Global database 350 includes a relational database further comprising a set of tables, each table having a set of rows and columns, the rows corresponding to database records and columns corresponding to fields in each record. The database records in global database 350 include a set of synchronized copies of the local database records in the local databases of all handheld devices attached to the server and all local controllers attached to the server. In a preferred embodiment, the tables in global database 350 include at least a human resource table 800 for holding employee and other onsite personnel data, an asset table 840 for holding information identifying and describing assets and an associations table 870 for associating one asset to another asset, for associating one asset to one person and for associating one person to another person.

Segments of the human resource table, asset table and association table are held in the local databases of each handheld devices and synchronized into the global database. Each handheld device and the server execute a set of program instructions to perform operations on and with the association table, the asset table and the human resource table. The association table is operated on within a scheduling program and as an asset control program to control the movement of assets, control the movement of visitors and control the movement of personnel in and between secure environments.

Figure 8A:
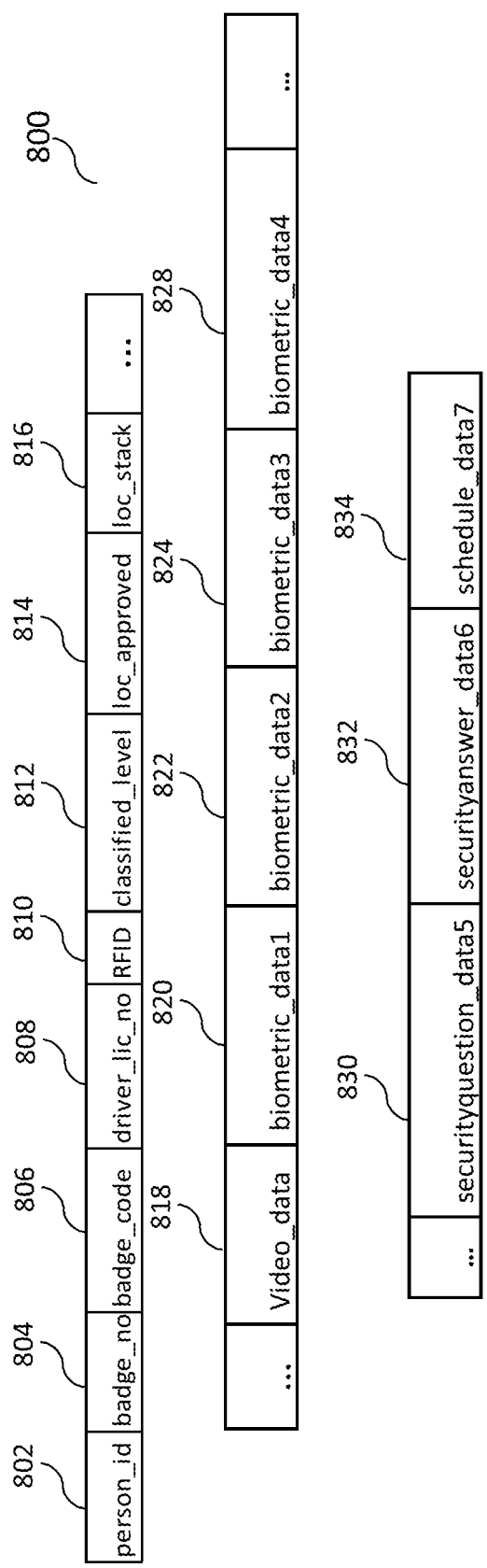
FIG. 8A is a block diagram of a memory model of a human resource table of a preferred embodiment of a handheld device.

Referring to FIG. 8A, human resource table 800 includes a set of human resource records further comprising person id field 802, badge id field 804, badge code field 806, driver license number field 808, RFID field 810, level of classified access field 812, set of approved locations field 814, field holding a pointer to a location stack entry 816, video data field 818, and set of biometric data fields 820, 822, 824, and 828 corresponding to different types of biometric data, security question field 830, security answer field 832 and schedule field 834. The schedule field includes a set of location codes and associated allowed time intervals.

Figure 8B:
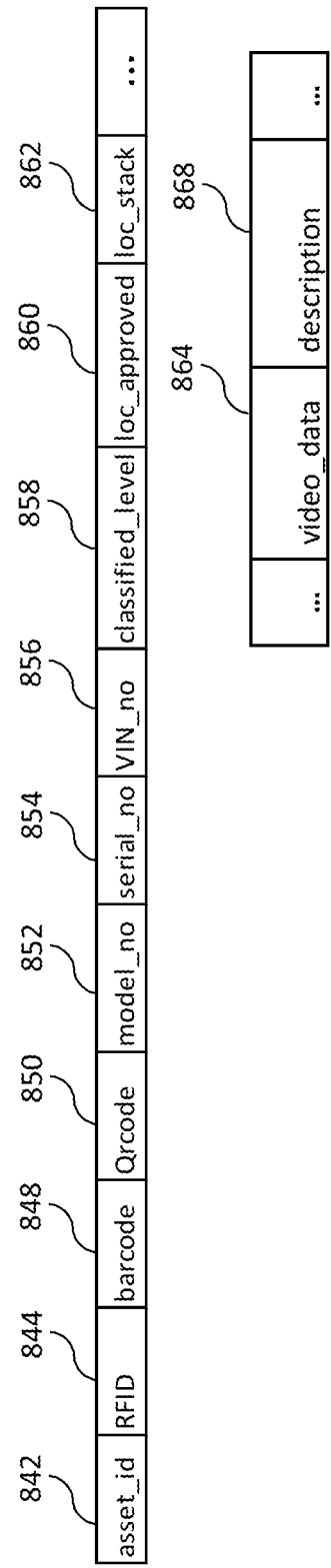
FIG. 8B is a block diagram of a memory model of an asset table of a preferred embodiment of a handheld device.

Referring to FIG. 8B, asset table 840 includes a set of asset records further comprising asset id field 842, RFID field 844, barcode field 848, QR code field 850, model number field 852, serial number field 854, VIN number field 856 used for identifying vehicle assets, level of classification 858 required to receive the asset, set of approved locations 860 for the asset, field holding a pointer to a location stack entry 862, video data field 864 for holding a visual record of the item, and description field 868 for holding a text description of the item.

Referring to FIG. 8C, association table 870 includes a set of association records having at least association id field 871, first person id field 872, second person id field 873, first asset id field 874, second asset id field 875, description of the reason for the association 876, set of instructions pertaining to the association 877, expected location 878 pertaining to a scheduled location of the association, expected time field 879 pertaining to a scheduled time, observed location field 880 for recording an observed location, observed time field 881 for recording a observed time corresponding to the observed location, checked-out Boolean field 882 and checked-in Boolean field 883. The first and second person id fields contain foreign keys to records in the human resource table. The first and second asset id fields contain foreign keys to records in the asset table.

Referring to FIG. 8D, a location stack table 890 describes the location of each person and each asset in the global database. Each tracking record is associated to a security event, such as badge scan at an entry/exit point. The location stack table is defined by event id field 891, event time field 892, area to (area entered) field 893, area from (area exited) field 894, photograph field 895, person id field 896 and asset id field 897. The photograph field is for storing photograph of an event area to the event time. The location stack table has a set of rows with one row specifying an event entry.

An example of anti-passback using the location stack table is as follows. At event 0, a security badge is located outside of the facility. At event 1, the security badge is scanned at time 11:00 a.m. while entering security area 1 and leaving security area 0. No picture is taken. At event 2, the security badge is scanned at time 11:05 a.m. entering security area 2 from security area 1. A picture is taken. At event 3, the security badge is scanned at time 11:12 a.m. entering security area 3 and exit security area 2. A picture is taken. At event 4, the security badge is scanned at time 12:01 p.m. while entering security area 1 and exiting security area 0. A picture is taken. Event 4 represents an "anti-passback" violation because the "area to" field of event 3 does not match the "area from" field of event 4.

Figure 9A:
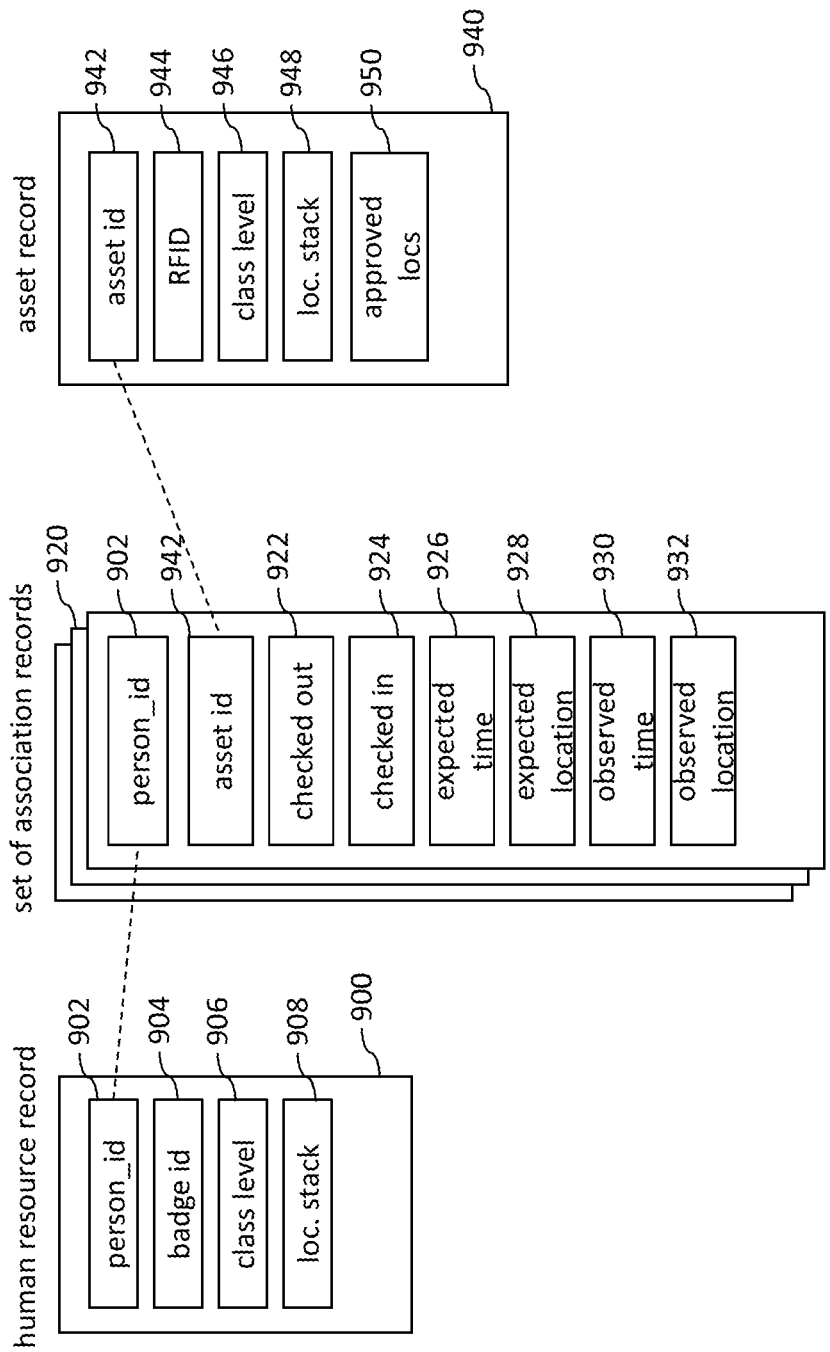
FIG. 9A is a block diagram depicting of a database data association of a preferred embodiment of a handheld device.

Referring to FIG. 9A, preferred embodiment of a database association table in the global and local databases is described. A set of data records for the human resource table, the asset table and the association table is disclosed to illustrate association of people to assets. An asset holder has a human resource record 900 in the human resource table that includes a first set of fields populated with person id 902, a badge id 904 for a security badge, a classification level 906 and a location stack 908, where the location stack 908 is a set of entries in the location stack table for the person id 902.

An asset has an asset record 940 in the asset table that includes a second set of fields populated with asset id 942, RFID code 944, classification level 946, location stack 948 and set of approved locations 950. Other identifiers assigned to asset id 942 besides RFID code 944 are possible, for example, a bar code. The location stack 948 is a set of entries in the location stack table for the asset id 942.

An asset association record in set of asset association records 920 includes asset id 942, person id 902, checked-out field 922, checked-in field 924, expected time field 926, expected location field 928, observed time field 930 and observed location field 932. When the asset is initially assigned to the asset holder during a check-out process, the asset is associated to the asset holder in a first asset association record in set of association records 920 with a location value in the observed location, a time value in the observed time field and a checked-out field set to be true.

Figure 9B:
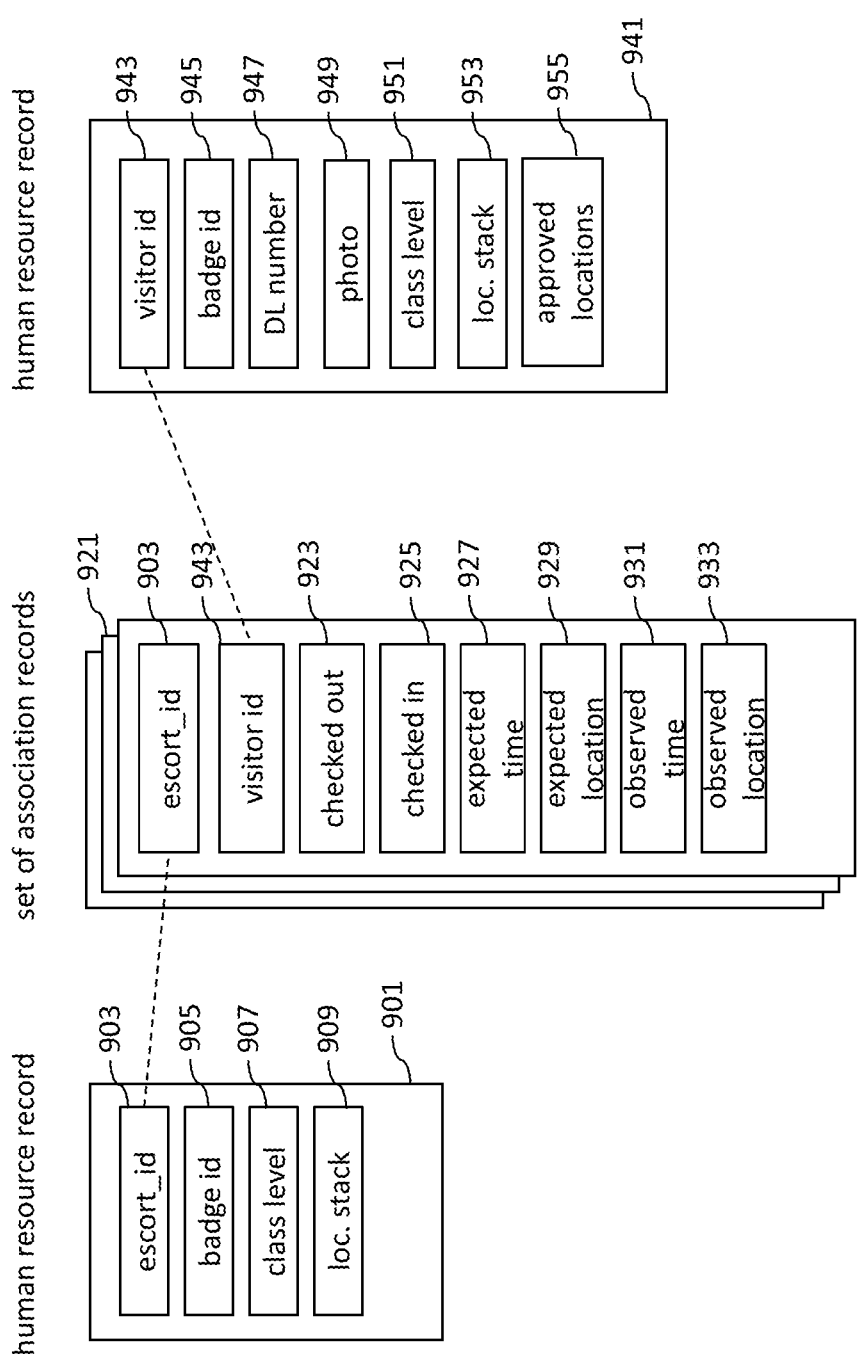
FIG. 9B is a block diagram depicting of a database data association of a preferred embodiment of a handheld device.

Referring to FIG. 9B, preferred embodiment of a database association table in the global and local databases is described. An alternate set of data records for the human resource table and the association table is disclosed to illustrate association of people to people. For example, a visitor is assigned to a corporate escort while visiting a facility. The human resource table has a human resource record 941 for the visitor and a human resource record 901 for the corporate escort. The global database further includes an association table with a set of association records 921. The visitor is associated to the escort according to a schedule in set of association records 921. The set of association records are used to track the visitor schedule, locations and additional escorts.

Human resource record 941 for the visitor includes a first set of fields populated with visitor id 943, badge identifier 945, driver license number 947, digital photo 949, classification level 951, location stack 953 and a set of approved locations 955. Human resource record 901 for the corporate escort includes a second set of fields populated with escort id 903, badge id 905, classification level 907 and a location stack 909. Each association record in the set of association records 921 include a first person id field containing escort id 903, second person id field containing visitor id 943, checked-out field 923, checked-in field 925, expected time field 927, expected location field 929, observed time field 931 and observed location field 933. At the time that the visitor checks in at a main security station, the visitor is associated to the corporate escort in a first asset association record in set of association records 921 with a location value in the observed location, a time value in the observed time field and a checked-out field set to be true.

Figure 9C:
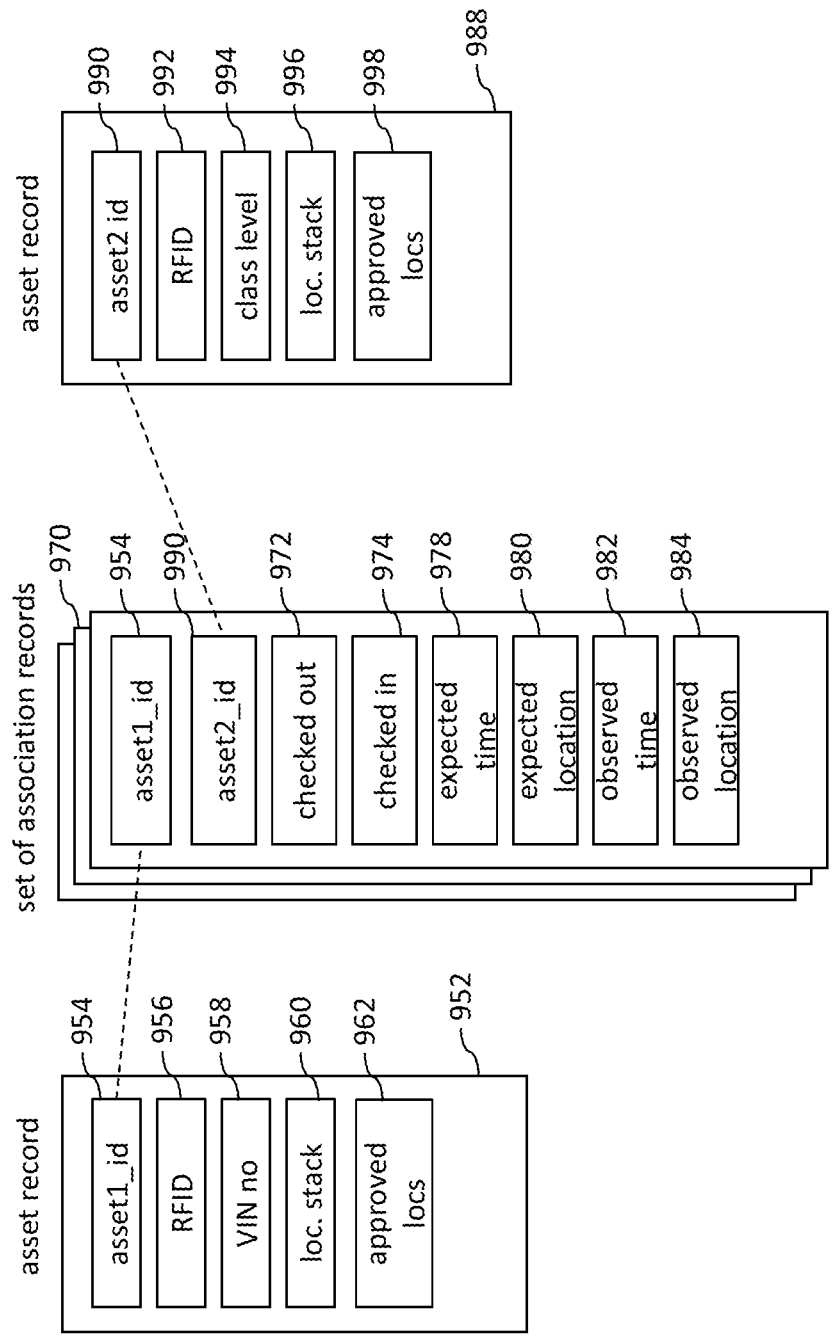
FIG. 9C is a block diagram depicting of a database data association of a preferred embodiment of a handheld device.

Referring to FIG. 9C, preferred embodiment of a database association table in the global and local databases is described. An alternate set of data records for the asset table and the association table is disclosed to illustrate association of assets to assets. For example, a set of field equipment is assigned to a vehicle. The asset table includes asset record 988 for the field equipment and asset record 952 for the vehicle. The global database further includes an association table with a set of association records 970. The field equipment is associated to the vehicle according to a schedule in set of association records 970. The set of association records are used to track the field equipment and the vehicle.

Asset record 988 for the field equipment is populated with asset2 id 990, RFID code 992, a classification level 994, a location stack 996 and a set of approved locations 998. Other identifiers assigned to asset2 id 990 besides RFID code 992 are possible, for example, a bar code.

Asset record 952 for the vehicle includes asset1 id 954, RFID code 956, VIN number 958, location stack 960 and a set of approved locations 962. Other identifiers assigned to asset1 id 954 besides RFID code 956 are possible, for example, a bar code.

Each association record in the set of association records 970 include a first asset id field containing asset1 id 954, second asset field containing asset2 id 990, checked-out field 972, checked-in field 974, expected time field 978, expected location field 980, observed time field 982 and observed location field 984. At the time that someone places the field equipment into the vehicle, the field equipment is associated to the vehicle in a first asset association record in set of association records 970 with a location value in the observed location, a time value in the observed time field and a checked-out field set to be true.

Figure 10:
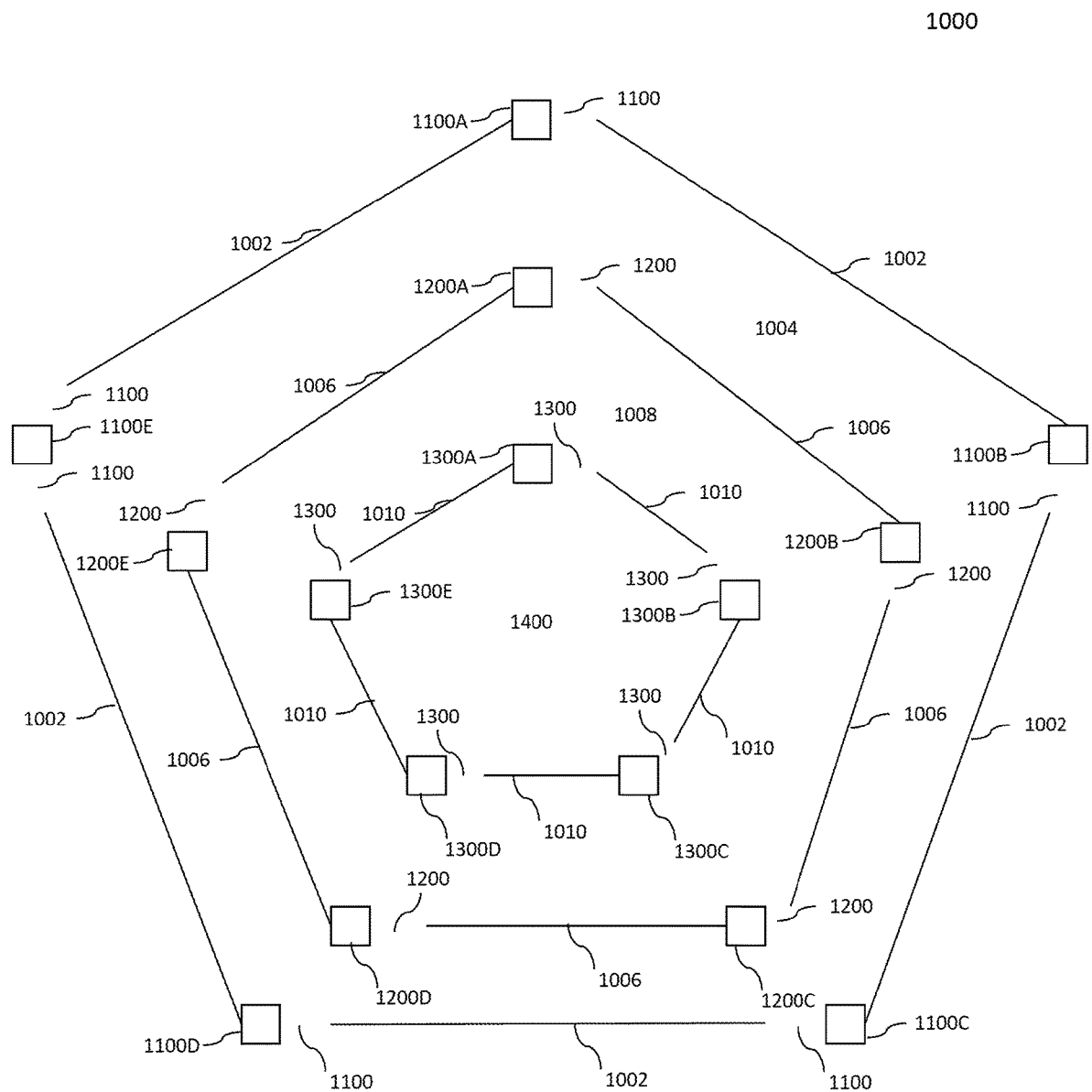
FIG. 10 is a schematic drawing of a preferred deployment of a set of handheld devices.

Referring then to FIG. 10, several examples of preferred deployment scenarios are described. However, one of skill in the art will recognize that many other deployment scenarios are possible. Secure perimeters 1002, 1006 and 1010 provide impenetrable barriers to personnel and vehicles and can be either man-made or natural, for example, a fence, walls in a building, a mountain range or a river. Secure perimeter 1002 provides a barrier between non-secure area 1000 and secure area 1004. Similarly, secure perimeter 1006 provides a barrier between secure areas 1004 and 1008, and secure perimeter 1010 provides a secure barrier between secure area 1008 and secure area 1400.

Gaps, such as portals, doors or other breeches in the secure perimeters are present. For example, portals 1100 exist in secure perimeter 1002, portals 1200 in secure perimeter 1006, and portals 1300 exist in secure perimeter 1010. Each portal is associated with a specific geographic location and unambiguously identified to the system and stored in the global database. For example, GPS coordinates, gate numbers or building door locations. Movement of personnel, vehicles and assets must necessarily travel through one of portals 1100, 1200, and 1300 in order to move between non-secure area 1000, secure area 1004, secure area 1008 and secure area 1400.

In one preferred embodiment of a deployment scenario, a handheld device is physically located in each gap. For example, security devices 1100A-1100E are deployed in the portals of secure perimeter 1002. Handheld devices 1200A-1200E are deployed in the portals 1200 of secure perimeter 1006. Similarly, handheld devices 1300A-1300E are deployed in portals 1300 of secure perimeter 1010.

In a first deployment example, a secure building, such as the Pentagon, has an access control point, such as a door controller, malfunction. In this scenario, a single handheld device is deployed at the access control point to substitute for the malfunctioning controller. A segment of the global database relevant to the malfunctioning door controller is downloaded to the handheld device, along with written instructions to the user, and an inventory of malfunctioning and replacement hardware and operational protocols and IP applications. The handheld device also receives driver information from installed physical hardware and peripheral devices that allows the handheld unit to operate as the local controller. Access control of the door resumes via the handheld device until repairs to the door controller can be made.

In a second deployment example, a security system and access control system, in an entire building, malfunctions. In this example, a separate handheld device is deployed at each access control point in the building such as gates, doors and vehicle entrances. Appropriate database segments, hardware inventories, protocols and drivers, instructions, and physical locations are downloaded to and implemented by each handheld device. The cameras attached to the handheld devices stream a video signal to the server to substitute for malfunctioning security cameras of the building. The deployment of handheld devices temporarily provides access control and video surveillance to the entire building until the malfunctions can be repaired.

In a third deployment example, man-made barriers are erected for all perimeters. A handheld device is deployed in each gap, providing a secure set of access points. Circumstances in which this type of deployment would be useful include public events and disease quarantine. In this deployment example, a complete copy of the global database, GPS coordinates for access points and instructions are downloaded to each handheld device. The peripheral devices available at the handheld devices provide physical security without any interface with legacy hardware.

A fourth deployment example, a standalone handheld device is deployed from a secure area, such as secure area 1004; however, the handheld device is not associated any gap, portal or legacy hardware. In this scenario, a user exploits the portability of a wireless connection of the handheld device to conduct security checks at random. Individuals within the secure area can be checked for credentials, badges, biometric information, documents, scents, sounds and passwords through communication with and comparison to information in the local database or global database. Furthermore, picture data from a camera or stored in a database can be displayed on the display of the handheld device and compared to visual information or images available to the user. This scenario allows confirmation of the presence or absence of assets, vehicles, persons, documents, scents, sounds and other tangible things readily perceived by a human operator.

While this disclosure has been provided in reference to various preferred embodiments, along with other illustrative embodiments, the descriptions are not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

An embodiment of the present disclosure can take the form of an entirely hardware embodiment, an entirely software embodiment, or an embodiment containing both hardware and software elements. For example, one of the previously described embodiments may be implemented in software, which includes but is not limited to firmware, resident software, microcode, etc. In addition, various steps of the above processes may be performed in another order, split into additional steps, or combined into a single step. Steps may also be removed and or added to any of the above processes.

Furthermore, the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A system for controlling security access to an area having a perimeter and a set of access points in the perimeter, the system comprising:
a set of handheld security devices;
a set of local controllers, physically installed at the area, and communicatively coupled to the set of handheld security devices;
a set of local physical hardware, communicatively coupled to the set of local controllers, the set of local physical hardware comprising at least one of a group of doors, routers, and cameras;
the set of local physical hardware electronically controlled by the set of local controllers;
wherein the set of handheld devices are assigned to the set of access points to control the set of local physical hardware using the set of local controllers;
a set of replacement local controllers;
the set of replacement local controllers adapted to replace a set of inoperable local controllers of the set of local controllers;
the set of handheld security devices communicatively coupled to the set of replacement local controllers; and,
the set of local physical hardware controlled by the set of replacement local controllers and the set of handheld security devices.

2. The system of claim 1 further comprising:
a security server, having a first processor and a first memory, connected to the set of handheld security devices;
wherein the set of handheld security devices further comprises a set of second processors and a set of second memories;
a set of instructions, resident in the first memory and the second set of memories, that when executed cause:
the set of handheld security devices to transmit an event log to the security server; and,
the set of handheld security devices to receive an event instruction related to the event log from the security server.

3. The system of claim 1 further comprising:
a security server, having a first processor and a first memory, connected to the set of handheld security devices;
wherein the set of handheld security devices further comprises a set of second processors and a set of second memories;
a set of instructions, resident in the first memory and the second set of memories, that when executed cause:
the set of handheld security devices to transmit a security question event; and,
the set of handheld security devices to receive a security answer related to the security question event from the security server.

4. The system of claim 1 further comprising:
a security server, having a first processor and a first memory, connected to the set of handheld security devices;
wherein the set of handheld security devices further comprises a set of second processors and a set of second memories;
a set of instructions, resident in the first memory and the second set of memories, that when executed cause:
the set of handheld security devices to transmit an authorization event and a set of authorization data to the security server;
the security server to determine a clearance condition; and,
the set of handheld security devices to receive the clearance condition from the security server.

5. The system of claim 1 further comprising:
a security server connected to the set of handheld security devices;
a set of local databases connected to the set of handheld security devices;
a global security database connected to the security server; and,
wherein the set of local databases is synchronized with the global security database.

6. The system of claim 1 further comprising:
a set of physical security peripheral devices, interfacing with the set of handheld security devices.

7. The system of claim 1 further comprising:
a security server, having a first processor and a first memory, connected to the set of handheld security devices;
wherein the set of handheld security devices further comprises a set of second processors and a set of second memories;
a set of instructions, resident in the first memory and the second set of memories, that when executed cause:
the set of handheld security devices to update a remote database on the security server with an event log;
the set of handheld security devices to receive an authorization result from the security server related to the event log; and,
the set of handheld security devices to implement an authorization action based on the authorization result.

8. The system of claim 1 further comprising:
a set of security sensors connected to the set of handheld security devices;
a set of local databases associated with the set of handheld security devices;
a set of security data generated from the set of security sensors;
a clearance condition stored in the set of local databases;
the set of handheld security devices is programmed to:
compare the set of security data to the clearance condition to derive a set of clearance data; and,
generate a control signal based on the set of clearance data.

9. The system of claim 8 further comprising:
a security server, connected to the set of handheld security devices;
a global security database located in the security server; and,
the security server is programmed to log the set of clearance data in the global security database.

10. The system of claim 1 further comprising:
a security server, connected to the set of handheld security devices;
the security server programmed to send an interrupt to the set of handheld security devices; and,
the set of handheld security devices is programmed to execute a set of interrupt instructions related to the interrupt.

11. The system of claim 1 further comprising:
a display on each handheld security device of the set of handheld security devices;
a keypad on each handheld security device of the set of handheld security devices;
a set of picture data displayed on the display;
the set of handheld security devices is programmed to:
compare the set of picture data to a visual image; and,
receive a clearance response from the keypad based on the comparison.

12. The system of claim 11 wherein the set of handheld security devices is further programmed to:
display a security question on the display; and,
receive a security answer from the keypad.

13. The system of claim 1 further comprising:
a security server, connected to the set of handheld security devices, the security server programmed to:
receive a set of location data from the set of handheld security devices;
institute a location stack; and,
update the location stack based on the set of location data.

14. A system for controlling security access to an area having a perimeter and a set of access points in the perimeter, the system comprising:
a security server;
a set of handheld security devices connected to the security server;
a set of local controllers connected to the set of handheld security devices;
a set of local physical hardware connected to and controlled by the set of local controllers;

the set of local physical hardware comprising at least one of a group of doors, routers, and cameras;
wherein the set of handheld security devices is assigned to the set of access points to control the set of local physical hardware with the set of local controllers;
a location stack located on the set of handheld security devices;
a first identifier pushed onto the location stack;
a second identifier popped from the location stack;
wherein the set of handheld security devices is programmed to:
 compare the first identifier and the second identifier to derive a result; and,
 derive an error condition based on the result.

15. The system of claim 14 further comprising:
a set of anti-passback rules located on the set of handheld security devices; and,
wherein the set of handheld security devices is programmed to:
 compare the result to the set of anti-passback rules to determine a violation condition.

16. A system for controlling a security access to an area having a perimeter and a set of access points in the perimeter, the system comprising:
a security server;
a set of handheld security devices connected to the security server;
a set of local controllers physically installed at the area and connected to the set of handheld security devices;
a set of local physical hardware connected to and controlled by the set of local controllers;
the set of local physical hardware comprising at least one of doors, routers, and cameras;
the set of handheld devices assigned to the set of access points to control the set of local physical hardware using the set of local controllers;
a set of replacement hardware associated with a set of inoperable local physical hardware;
wherein the set of handheld security devices establishes communication with the set of replacement hardware; and,
wherein the set of replacement hardware is controlled by the set of local controllers and the set of handheld security devices.

17. The system of claim 16 further comprising:
a set of replacement local controllers associated with a set of inoperable local controllers;
wherein the handheld security devices establishes communication with the set of replacement local controllers; and,
wherein the set of local physical hardware is controlled by the set of replacement local controllers and the set of handheld security devices.

18. The system of claim 16 further comprising:
a set of security sensors connected to the set of handheld security devices;
a set of local databases stored on the set of handheld security devices;
a global security database stored on the security server;
a set of security data generated from the set of security sensors;
a clearance condition stored in the set of local databases;
wherein the set of security data is compared to the clearance condition, by the set of handheld security devices, to derive a set of clearance data; and,
wherein the set of clearance data is logged, by the security server, in the global security database.

19. The system of claim 16 further comprising:
a display on each handheld security device of the set of handheld security devices;
a keypad on each handheld security device of the set of handheld security devices;
a set of pictures data displayed on the display;
wherein the set of picture data is compared, by the set of handheld security devices, to a visual image; and,
a clearance response received, by the set of handheld security devices, from the keypad based on the comparison.

20. The system of claim 16 further comprising:
a set of local databases stored on the set of handheld security devices;
a global security database stored on the security server; and,
the set of handheld security devices is synchronized with the set of local databases to the global security database.

* * * * *